United States Patent
Deng

(10) Patent No.: US 7,658,564 B2
(45) Date of Patent: Feb. 9, 2010

(54) PALM REST WITH DETACHABLE ASSEMBLY MECHANISM

(75) Inventor: YongTong Deng, Xian (CN)

(73) Assignee: Lite-On Technology Corporation, Taipei (TW)

(*) Notice: Subject to any disclaimer, the term of this patent is extended or adjusted under 35 U.S.C. 154(b) by 562 days.

(21) Appl. No.: 11/442,112

(22) Filed: May 30, 2006

(65) Prior Publication Data

US 2007/0280771 A1 Dec. 6, 2007

(51) Int. Cl.
*B41J 11/62* (2006.01)
(52) U.S. Cl. .................. 400/715; 16/271; 248/118
(58) Field of Classification Search .......... 400/714, 400/715; 16/271, 257; 248/118, 118.1
See application file for complete search history.

(56) References Cited

U.S. PATENT DOCUMENTS 5,826,839 A * 10/1998 Chen .................. 248/118
2005/0121567 A1 * 6/2005 Meuniot ................ 248/150
2006/0168783 A1 * 8/2006 Anscher ................ 24/615

* cited by examiner

*Primary Examiner*—Judy Nguyen
*Assistant Examiner*—Allister Primo
(74) *Attorney, Agent, or Firm*—Rosenberg, Klein & Lee

(57) ABSTRACT

A palm rest with a detachable assembly mechanism attaches to a keyboard via the detachable assembly mechanism. The palm rest has a shell and at least one assembly mechanism. The shell forms a concave portion. The assembly mechanism has a base and a joint arm. The base is disposed in the concave portion of the shell. One end of the joint arm is pivotally mounted on the base so that the joint arm is rotatable and retractable in order to be received in the concave portion. The other end of the joint arm can extend outside the shell for assembly with the keyboard.

9 Claims, 5 Drawing Sheets

PALM REST WITH DETACHABLE ASSEMBLY MECHANISM

BACKGROUND OF THE INVENTION

1. Field of the Invention

The present invention relates to a palm rest with a detachable assembly mechanism, and particularly to a palm rest that utilizes a detachable assembly mechanism that attaches to a keyboard.

2. Description of Related Art

In prior art, palm rests are used to prevent the user's palm from being suspended in mid air while typing by keyboard for ergonomic purposes.

However, the palm rest in prior art usually uses a pair of fastening members in order to attach the palm rest to a keyboard. The fastening members clip onto a pair of clipping slots formed on the keyboard, and the fastening members usually protrude outside the palm rest and cannot be retracted. Some fastening members protrude beyond the side of the palm rest, while some fastening members protrude beyond the bottom of the palm rest. Such a design directly affects packaging and transportation. For example, it creates many cavities in the package, wasting much space. The total occupied space of the palm rest is therefore increased, which reduces the capacity of a container and increases transportation costs.

Accordingly, the present invention proposes a palm rest that can be assembled with keyboards and without the disadvantages of the prior art.

SUMMARY OF THE INVENTION

It is therefore a main object of the invention to provide a palm rest with a detachable assembly mechanism that attaches to keyboards. The assembly mechanism of the palm rest is detachable. Furthermore the assembly mechanism is also foldable so that it can be packaged more conveniently and is extendable for installation and use. Thereby, the assembly mechanism of the palm rest of the present invention is designed to overcome the troublesomeness of the conventional palm rest for keyboards.

For achieving the aforesaid objects, the present invention provides a palm rest with a detachable assembly mechanism. The palm rest has at least one assembly mechanism for assembling the palm rest to a keyboard. The palm rest includes a shell, and at least one assembly mechanism. The shell forms a concave portion. The assembly mechanisms are accommodated in the concave portion of the shell. Each of the assembly mechanisms includes a joint arm. The joint arm has a first end and a second end. The first end is pivotably mounted to the palm rest, so that the joint arm is rotatable relative to the palm rest and is received in the concave portion. The palm rest has a second end that clips onto the keyboard.

To make it easier for the examiner to understand the innovative features and technical content, a preferred embodiment together with the attached drawings for the detailed description of the invention has been used, but it should be pointed out that the attached drawings are provided for reference and description, but not for limiting the present invention.

BRIEF DESCRIPTION OF THE DRAWINGS

The invention will be better understood and objectives other than those set forth above will become apparent when consideration is given to the following detailed description thereof. Such description makes reference to the attached drawings, wherein.

DETAILED DESCRIPTION OF PREFERRED EMBODIMENTS

Figure 1:
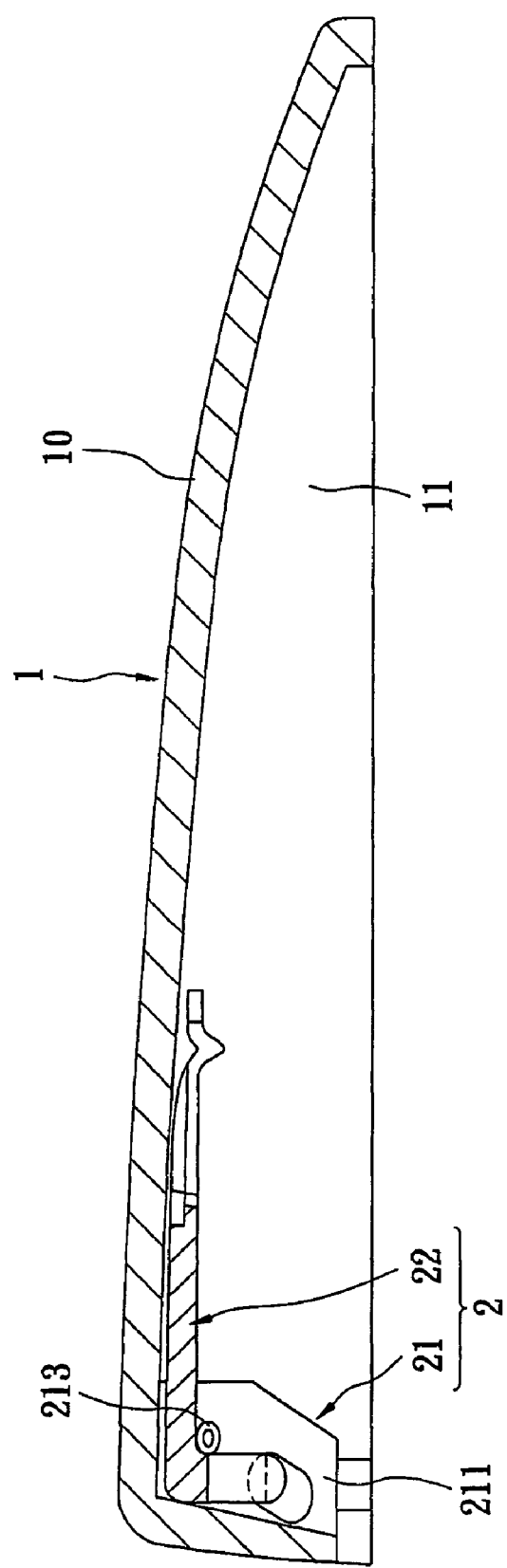
FIG. 1 is a cross-sectional view of a palm rest after it has been folded for packaging of the present invention.
Figure 2:
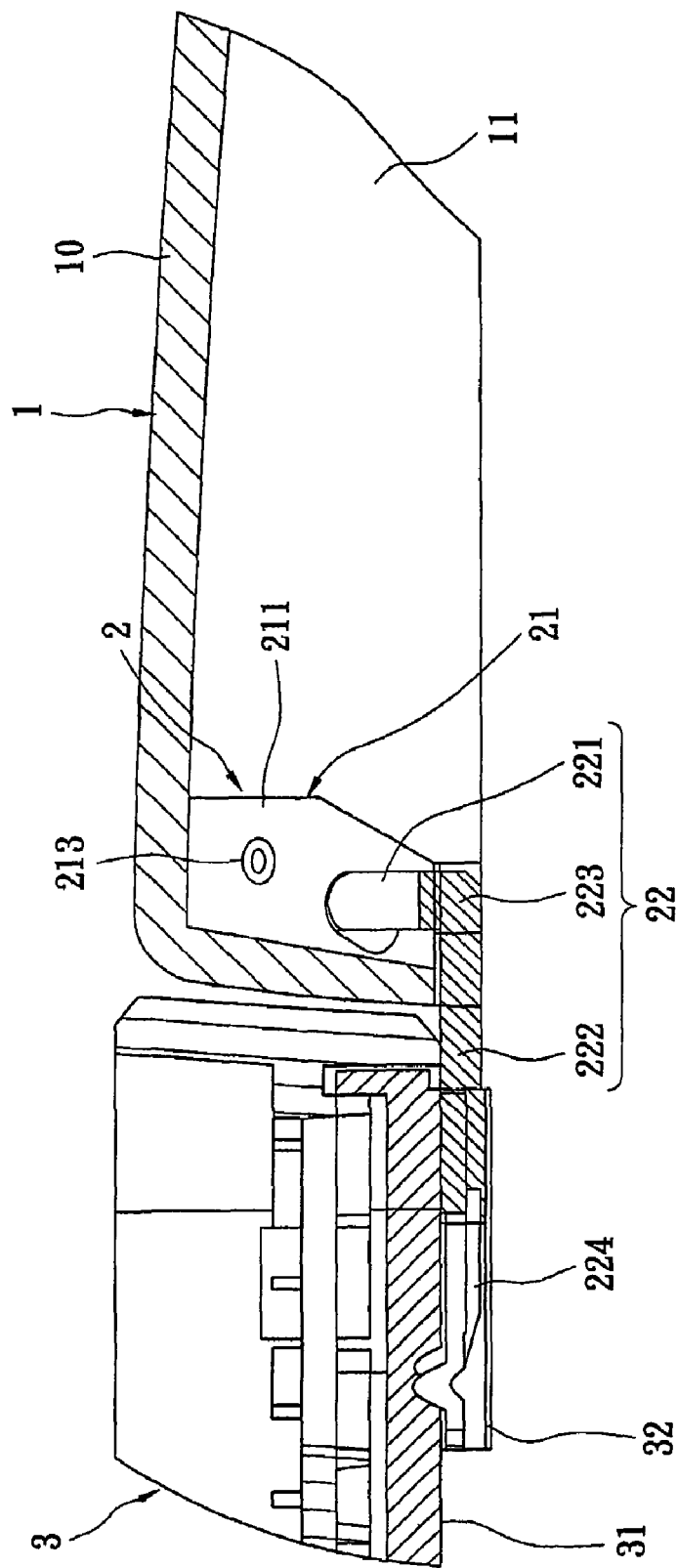
FIG. 2 is a cross-sectional view of a palm rest assembled with a keyboard in an extended condition for installation of the present invention.

Reference is made to FIGS. 1 and 2, which are cross-sectional views of a palm rest having been folded and received, and assembled with a keyboard in an extended condition. The palm rest 1 of the present invention can be assembled with a keyboard 3 that is shown partially in FIG. 2. A keyboard user's palm therefore would not be suspended midair thereby fulfilling the present invention's ergonomic aim.

Referring to FIG. 1, the palm rest 1 includes a shell 10. The shell 10 forms a concave portion 11 that is concaved from its bottom surface. At least one detachable assembly mechanism 2 could be received in the concave portion 11. The assembly mechanisms 2 are used to attach the palm rest 1 to the keyboard 3.

Each of the assembly mechanisms 2 include a base 21 and a joint arm 22 connecting with the base 21. The base 21 is formed in the concave portion 11 of the shell 10. One end of the joint arm 22 (hereinafter, designated as the first end) is pivotably mounted within the base 21. The joint arm 22 therefore is rotatable and is received in the shell 10, as shown in FIG. 1. Alternatively the joint arm 22 can be rotated to extend to the other end outside (hereinafter, designated as the second end) the shell 10 to attach to the keyboard 3, as shown in FIG. 2.

Figure 3:
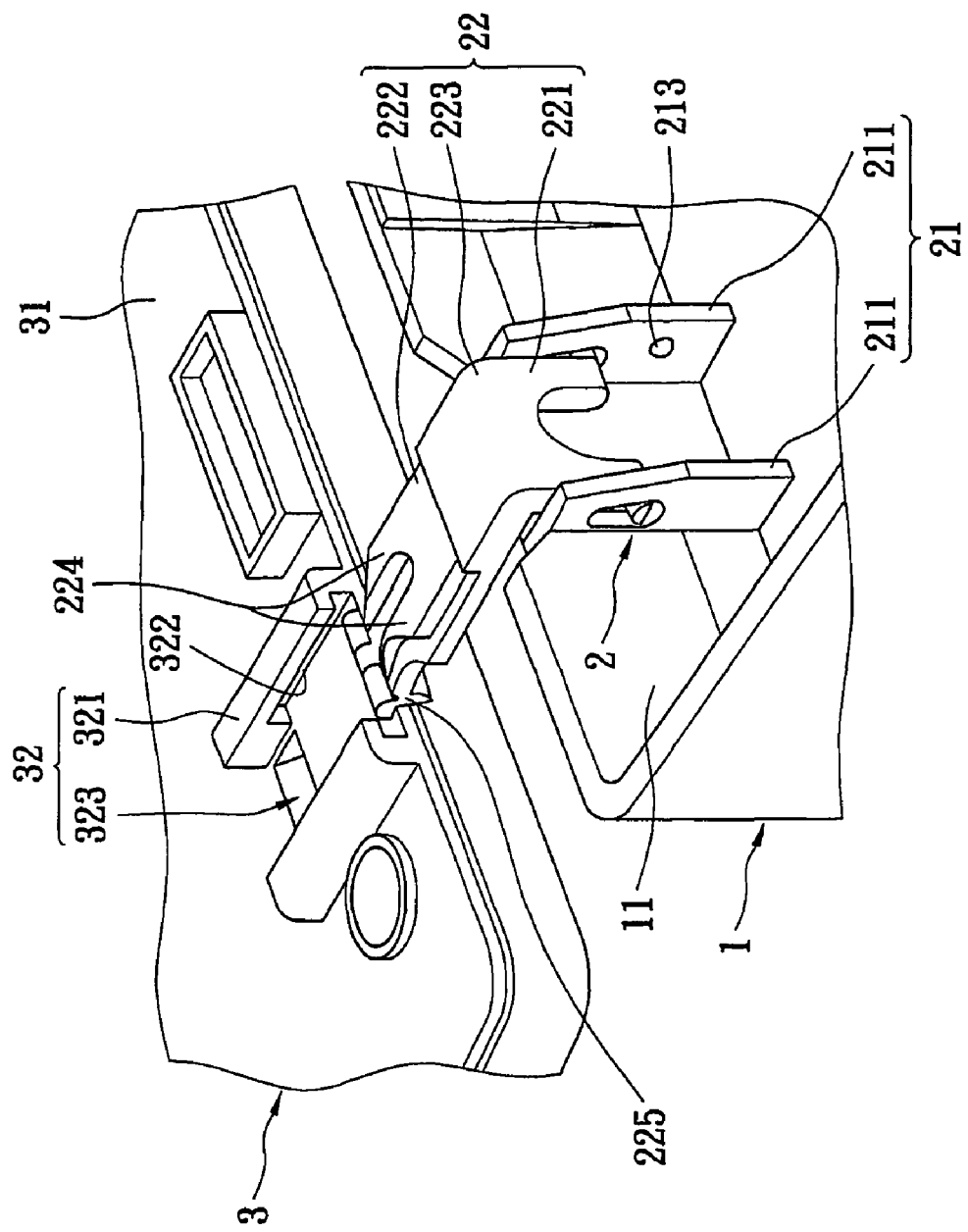
FIG. 3 is a perspective bottom view of a palm rest before assembly with a keyboard of the present invention.
Figure 4:
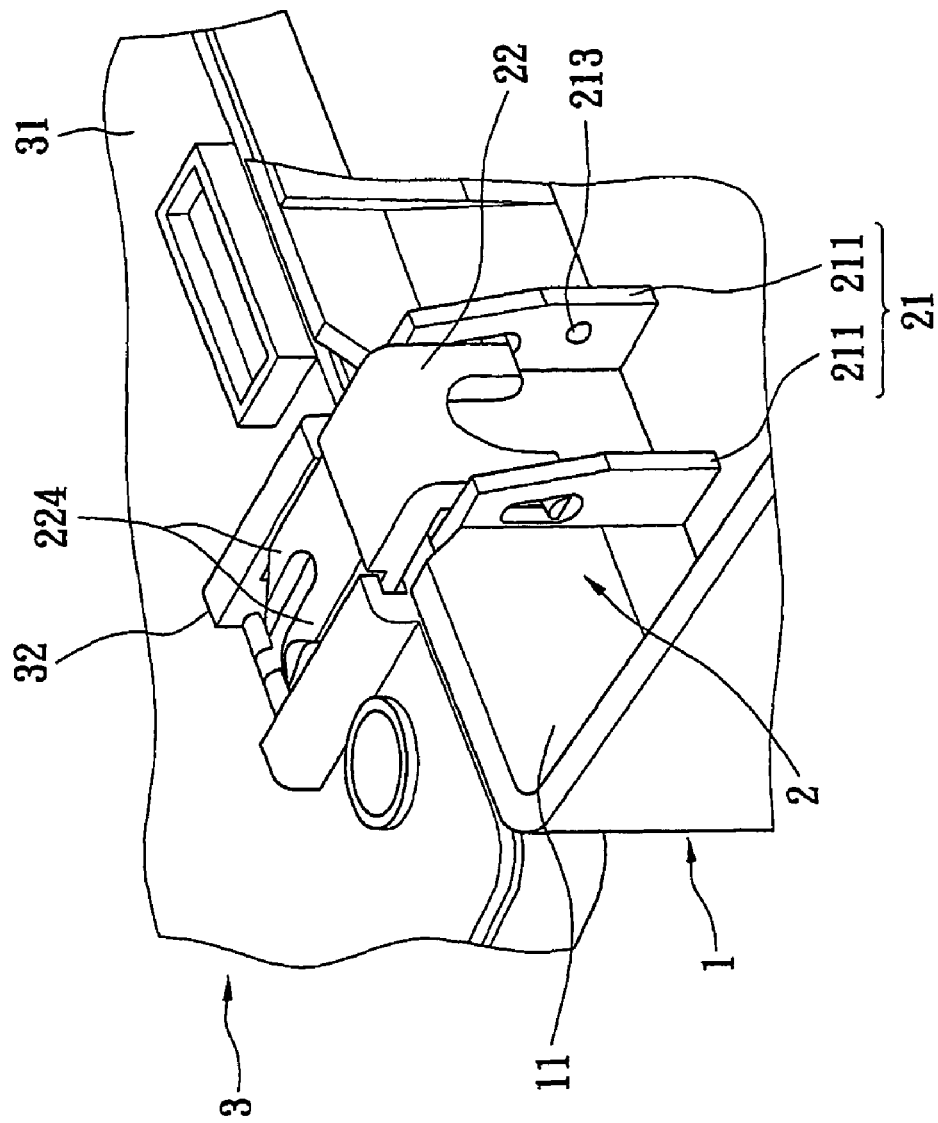
FIG. 4 is a perspective bottom view of a palm rest after assembly with a keyboard of the present invention.

The assembly mechanism 2 is described in detail thereinafter. Reference is made to FIGS. 3 and 4, which are perspective bottom views of a palm rest before and after it has been attached to a keyboard of the present invention. The base 21 of the assembly mechanism 2 includes two symmetrical, parallel walls 211 that extend from the shell 10 of the palm rest 1 toward the concave portion 11.

The joint arm 22 includes a first end 221, a second end 222, and a curved portion 223 connecting the first end to the second end. The first end 221 is mounted pivotably between the two walls 211 of the base 21, so that the joint arm 22 can be rotated or turned over along a pivoting portion. A plurality of elastic buckling fingers 224 extend out from the second end 222. Each of the elastic buckling fingers 224 forms a buckling part 225, as shown in FIG. 3. The palm rest 1 can be therefore elastically clipped onto the keyboard 3.

To fix the joint arm 22 after it has been received in the palm rest 1, the base 21 forms at least one fixing bump 213 on one of the walls 211. The base 21 can also be formed with a pair of fixing bumps 213, which respectively protruding inwardly from the wall 211. The fixing bumps 213 position the joint arm 22 in the palm rest 1.

Reference is made to FIG. 4. The keyboard 3 has at least one combining member 32 at its bottom surface 31. The combining member 32 includes a pair of guiding rails 321 and a buckle depression 323 formed between the pair of guiding rails 321. Each of the guiding rails 321 is formed with a sliding slot 322 opposite to each other. The second end 222 of the joint arm 22 is disposed in the sliding slot 322 of the pair of guiding rails 321 in a slidable manner. Next, the elastic buckling fingers 224 of the second end 222 are clipped into the buckle depressions 323 of the keyboard 3 at the predetermined fixed positions, as shown in FIGS. 2, 3, and 5.

In an alternative embodiment, the combining members 32 can be separated from the keyboard 3. For example, the combining members 32 are adhered or screwed to the bottom surface of the keyboard 3. Therefore, the present invention can be utilized to all keyboards which lack palm rests.

Figure 5:
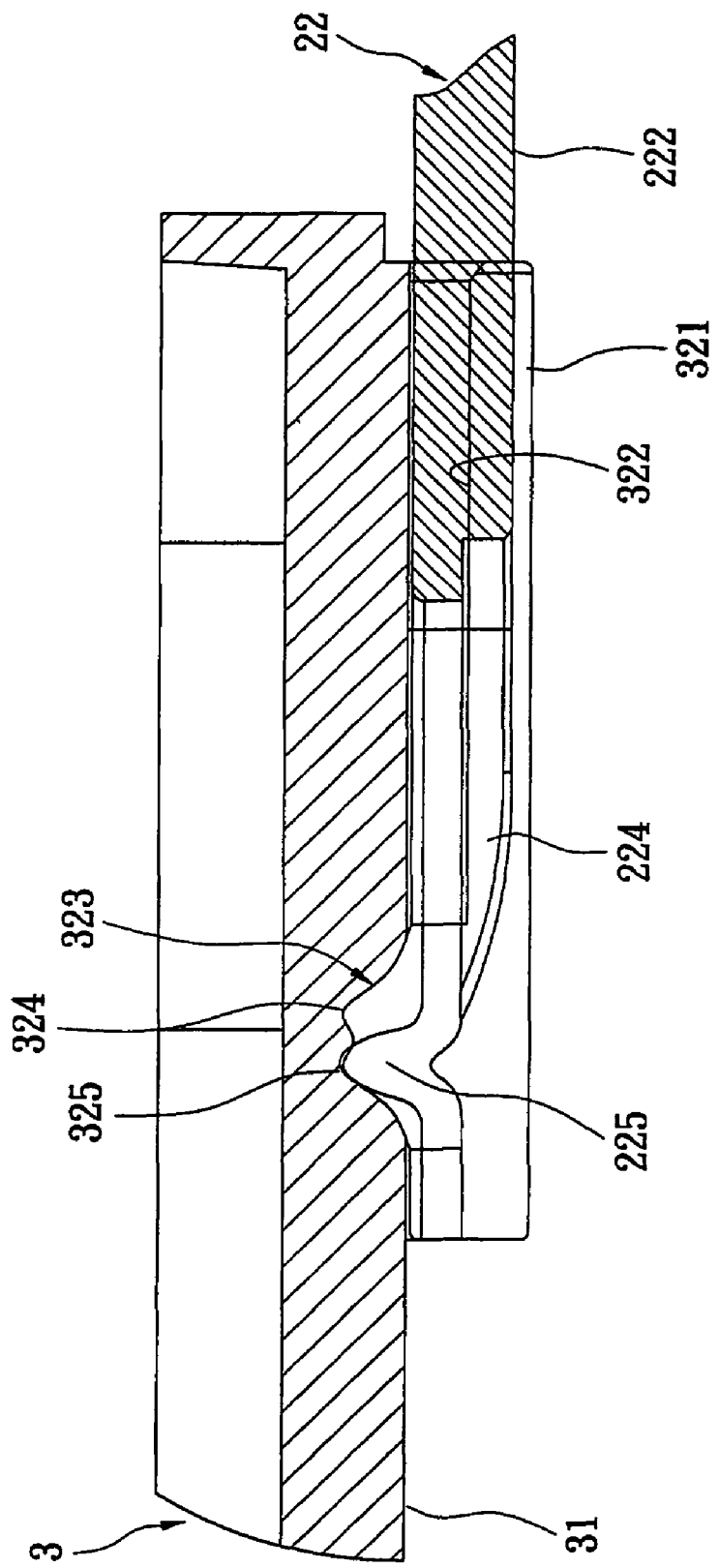
FIG. 5 is a partial magnified view of a palm rest according to FIG. 2 of the present invention.

Reference is made to FIG. 5. In this embodiment, the buckle depression 323 of the combining member 32 is formed at the bottom surface of the keyboard 3, and is shaped like a "W" when viewed side on. In other words, the buckle depression 323 has two adjacent valleys 324, 325. The buckling part 225 of the elastic buckling finger 224 will slide into the valley 324 at an outer side when being assembled, and then slide into the valley 325 at an inner side when it is pushed. Such a structure not only ensures that the palm rest is attached to the predetermined position, but also provides a larger and therefore more convenient detaching space when detaching the palm rest 1 from the keyboard 3.

The present invention utilizes the assembly mechanism 2 which can be rotated along its pivoting portion, so that it can be folded and received in the concave portion 11 of the palm rest 1 for packaging convenience, as shown in FIG. 1. In other words, it reduces cavities in the packaged product and less space is wasted. The total space of the palm rest is not enlarged, so that transportation costs are not increased. Moreover, the assembly mechanism 2 extends outside the concave portion 11 of the palm rest 1 along its pivoting portion, as shown in FIG. 2. The second end 222 of the assembly mechanism 2 can slide into the pair of guiding rails 321, and the elastic buckling finger 224 of the second end 222 can be clipped in the buckle depression 323 of the keyboard 3 at the end point of the sliding stroke, such as can be seen in FIGS. 2, 3 and 5.

In the present invention, if the user wants to detach the palm rest 1 (not shown), the elastic buckling finger 224 can be smoothly released from the buckle depression 323, and the second end 222 can be released from the guiding rails 321. The palm rest 1 is thereby detached.

In summation of the description above, the palm rest of the invention includes the following advantages:

The assembly mechanism 2 of the palm rest 1 adopts a detachable structure, which includes the base 21 and the joint arm 22 combined in a pivotal way. The assembly mechanism 2 can therefore be retracted into the concave portion 11 when packaged, and can be extended outside the concave portion 11 when assembled with the combining member 32 of the keyboard 3 when being attached to the keyboard. The packaged product has few cavities thereby reducing the total size of the palm rest and minimizing transportation costs.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A palm rest with a detachable assembly mechanism for a keyboard, comprising:
    a shell having a concave portion therein; and
    at least one assembly mechanism disposed in said concave portion for releasably coupling said palm rest to the keyboard, said assembly mechanism including a base affixed to said shell within said concave portion and a joint arm having a first end pivotally coupled to said base, said joint arm being rotatable between a first position for storage of said joint arm within said concave portion and a second position extending from said shell, said joint arm having a second end adapted for releasable coupling to the keyboard.

2. The palm rest with a detachable assembly mechanism as claimed in claim 1, wherein said base includes a pair of walls, and said first end of said joint arm is pivotally mounted between said pair of walls.

3. The palm rest with a detachable assembly mechanism as claimed in claim 1, wherein said second end of said joint arm is formed with an elastic buckling finger, said buckling finger is being engaged with said keyboard.

4. The palm rest with a detachable assembly mechanism as claimed in claim 1, further comprising a combining member coupled to the bottom of the keyboard, said second end of said joint arm being releasably engageable with said combining member.

5. The palm rest with a detachable assembly mechanism as claimed in claim 4, wherein said combining member includes at least one guiding rail, said second end of said joint arm being slidably engaged with said guiding rail.

6. The palm rest with a detachable assembly mechanism as claimed in claim 4, wherein said combining member includes a buckle depression, said second end of said joint arm including a buckling part protruding therefrom and engageable with said buckle depression.

7. The palm rest with a detachable assembly mechanism as claimed in claim 6, wherein said buckle depression has two adjacent valleys for selectively being engaged by said buckling part.

8. The palm rest with a detachable assembly mechanism as claimed in claim 2, wherein each of the pair of walls has a fixing bump formed on an inner surface thereof.

9. The palm rest with a detachable assembly mechanism as claimed in claim 8, wherein said joint arm includes a curved portion formed between said first end and said second end thereof, said curved portion of said joint arm being engageable by said fixing bumps for releasably retaining said joint arm in said first position inside said concave portion.

* * * * *